United States Patent
Slassi et al.

(10) Patent No.: US 11,762,506 B2
(45) Date of Patent: Sep. 19, 2023

(54) HANDLING NOISE INTERFERENCE ON AN INTERLINK

(71) Applicant: Microsoft Technology Licensing, LLC, Redmond, WA (US)

(72) Inventors: Matan Slassi, Herzelyia (IL); Assaf Cohen, Modiin (IL); Ori Laslo, Rehovot (IL); Lior Zagiel, Tel-Aviv (IL); Netanel Hadad, Lod (IL)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/658,987

(22) Filed: Apr. 12, 2022

(65) Prior Publication Data

US 2023/0236699 A1 Jul. 27, 2023

Related U.S. Application Data

(60) Provisional application No. 63/267,092, filed on Jan. 24, 2022.

(51) Int. Cl.
*G06F 3/041* (2006.01)

(52) U.S. Cl.
CPC ...... *G06F 3/04182* (2019.05); *G06F 3/04162* (2019.05)

(58) Field of Classification Search
CPC .. G06F 3/04183; G06F 3/04162; G06F 3/416; G09G 2300/023; G09G 2300/026
See application file for complete search history.

(56) References Cited

U.S. PATENT DOCUMENTS

| 7,705,646 B2 | 4/2010 | Matsui |
| 9,189,113 B2 | 11/2015 | Yoshimura |
| 10,048,324 B2 | 8/2018 | Ishikawa |
| 2011/0029298 A1 | 2/2011 | Clement et al. |
| 2013/0172049 A1* | 7/2013 | Duong ............... G09G 5/006 455/559 |

(Continued)

FOREIGN PATENT DOCUMENTS

| JP | 5245145 B2 | 7/2013 |
| JP | 6498096 B2 | 4/2019 |
| WO | 2021126405 A1 | 6/2021 |

OTHER PUBLICATIONS

He, et al., "Modeling and Analysis of PDN Impedance and Switching Noise in TSV-Based 3-D Integration", In Journal of IEEE Transactions on Electron Devices, vol. 62, Issue 4, Apr. 2015, pp. 1241-1247.

(Continued)

*Primary Examiner* — Lisa S Landis
(74) *Attorney, Agent, or Firm* — Alleman Hall Creasman & Tuttle LLP

(57) ABSTRACT

Examples are disclosed that relate to handling noise interference on an interlink connecting hardware devices. One example provides a computing system comprising a first hardware device, a second hardware device, an interlink connecting the first hardware device and the second hardware device, a logic system, and a storage system. The storage system comprises instructions executable by the logic system to operate the interlink in an intermittently active mode, detect a noise interference scenario on the interlink, and in response, set a persistent active mode for the interlink.

18 Claims, 5 Drawing Sheets

(56) References Cited

U.S. PATENT DOCUMENTS

| | | | |
|---|---|---|---|
| 2018/0330694 A1* | 11/2018 | Klein | G06F 1/32 |
| 2019/0056803 A1* | 2/2019 | Nussbaum | G06F 3/0383 |
| 2020/0243041 A1 | 7/2020 | Tzeng et al. | |
| 2021/0383770 A1 | 12/2021 | Chen et al. | |

OTHER PUBLICATIONS

"International Search Report and Written Opinion Issued in PCT Application No. PCT/US22/048336", dated Feb. 9, 2023, 9 Pages.

* cited by examiner

HANDLING NOISE INTERFERENCE ON AN INTERLINK

CROSS REFERENCE TO RELATED APPLICATIONS

This application claims priority to U.S. Provisional Patent Application Ser. No. 63/267,092, titled HANDLING NOISE INTERFERENCE ON AN INTERLINK, filed Jan. 24, 2022, the entirety of which is hereby incorporated herein by reference for all purposes.

BACKGROUND

A computing system may have interacting subsystems that run on independent time bases (e.g., a separate clock for each of the interacting subsystems) to control a timing of the subsystem operations. In such computing systems, a common time base (e.g., a system clock) and communications link connecting the interacting subsystems can be used to help keep the interacting subsystems logically synchronized.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to handling noise interference on an interlink connecting hardware devices. One example provides a computing system comprising a first hardware device, a second hardware device, an interlink connecting the first hardware device and the second hardware device, a logic system, and a storage system. The storage system comprises instructions executable by the logic system to operate the interlink in an intermittently active mode, detect a noise interference scenario on the interlink, and in response, set a persistent active mode for the interlink.

DETAILED DESCRIPTION

Figure 1:
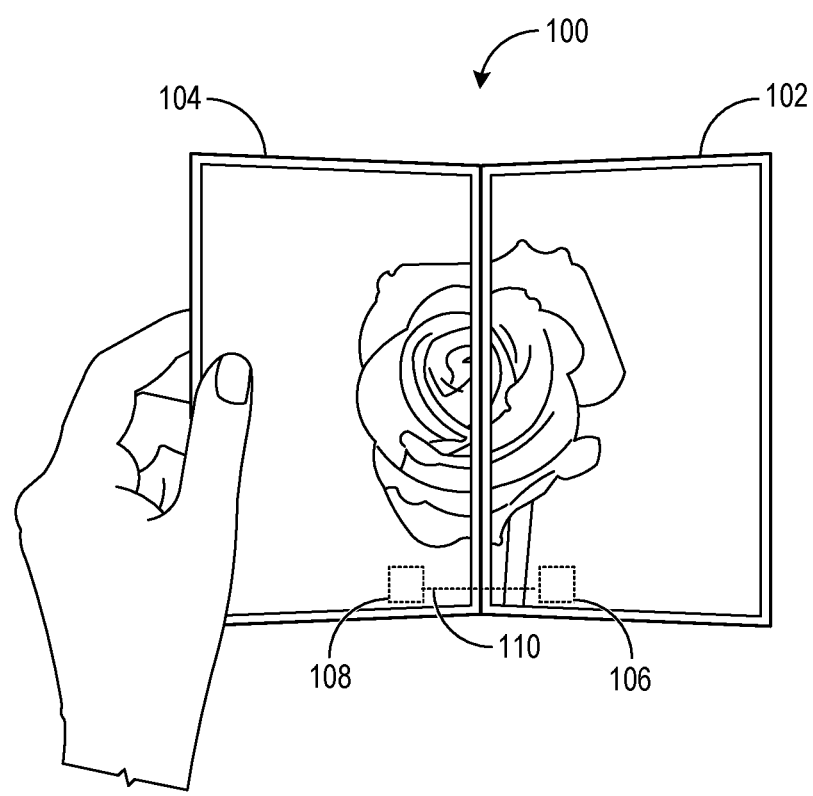
FIG. 1 shows an example computing system that may utilize an interlink between subsystem hardware devices.

As mentioned above, some computing systems use a common time base to control independent time bases of interacting subsystems in a synchronized manner. For example, a device having two or more touch sensitive displays ("touch screens") may have separate controllers for sensing touch and stylus inputs on each display. As another example, networked devices which communicate with each other also may operate in a synchronized manner via a common time base.

Some such computing systems may utilize an interlink to connect the interacting subsystems. For example, a device having multiple touch screens may utilize an interlink for communications between different touch screen controllers. To help reduce the power consumption of such an interlink, the interlink may by switched to an idle mode when not transferring data. In such cases, when the interlink switches from the idle mode to an active mode, the interlink may go through a clock and data recovery cycle to synchronize the communication clock between the interacting systems.

However, during the clock and recovery cycle, the interlink may be susceptible to noise interference. For example, ground bouncing due to other components (e.g., a speaker amplifier) may cause noise interference on the interlink and may impede the clock and data recovery cycle from synchronizing and locking, which may impact a user experience.

Accordingly, examples are disclosed that relate to detecting a noise interference scenario and setting an interlink to a persistent active mode in response. In contrast, when the interlink is in an intermittently active mode, the interlink can be in an idle mode when not transferring data. The interlink is used for communication between hardware devices of interacting computing systems. Setting the interlink to the persistent active mode may reduce an impact of the noise interference scenario on a clock and data recovery cycle of the interlink, and thereby may help to reduce a risk of interrupted communication between the hardware devices. In the example of a device having multiple touch screens, setting the interlink to a persistent active mode may help to avoid a loss of touch and stylus input on a touch screen. The term "noise interference scenario" as used herein indicates a situation where electrical noise on the interlink impacts an operation of the interlink. The term "interacting subsystems" indicates computing subsystems that are configured to communicate with each other over an interlink.

A noise interference scenario for an interlink may be detected in any suitable manner. In some examples, a noise interference scenario is detected via an interlink interrupt error. In other examples, a noise interference scenario may be detected at least in part on an output of a sensor of the computing system, such as a touch sensor, as a noise source also may cause detectable noise interference in the sensor output. In response, the computing system can take any suitable action to set the interlink to a persistent active mode. For example, the first hardware device and the second hardware device can perform a handshake to set the interlink into the persistent active mode. In some examples, such a handshake can comprise setting a force transmit active mode on the first hardware device, sending an interlink error message to the second hardware device, setting a force transmit active mode on the second hardware device, sending an acknowledge message to the first hardware device, and setting a persistent active mode for the interlink. In the force transmit active mode, the interlink is configured to remain active when not transferring data.

FIG. 1 shows an example computing system 100 that may utilize an interlink between interacting subsystems. Computing system 100 comprises a first touch screen 102, a second touch screen 104, a first hardware device 106, a second hardware device 108, and an interlink 110 connecting first hardware device 106 and second hardware device 108. In some examples, first hardware device 106 can comprise a first touch screen controller and second hardware device 108 can comprise a second touch screen controller. Interlink 110 can comprise a serdes (serializer-deserializer) differential pair, or any other suitable connection link. In some examples, interlink 110 can operate in an intermittently active mode. In the intermittently active mode, the interlink can be in an active mode when transferring data between first hardware device 106 and second hardware device 108, and in an idle mode when not transferring data. Such a configuration may help to reduce a power consumption of computing system 100.

As mentioned above, when interlink 110 switches from the idle mode to the active mode, first hardware device 106 and second hardware device 108 can execute a clock and data recovery cycle. However, in some situations, a noise interference scenario on interlink 110 may interfere with the clock and data recovery cycle such that a clock and data recovery lock may not occur. In the depicted example, an unsuccessful clock and data recovery lock may impact an operation of first touch screen 102 and/or second touch screen 104. Thus, where the noise interference scenario may interfere with the clock and data recovery cycle, setting a persistent active mode for interlink 110, as discussed below, may reduce a susceptibility of interlink 110 to the noise interference scenario.

Figure 2:
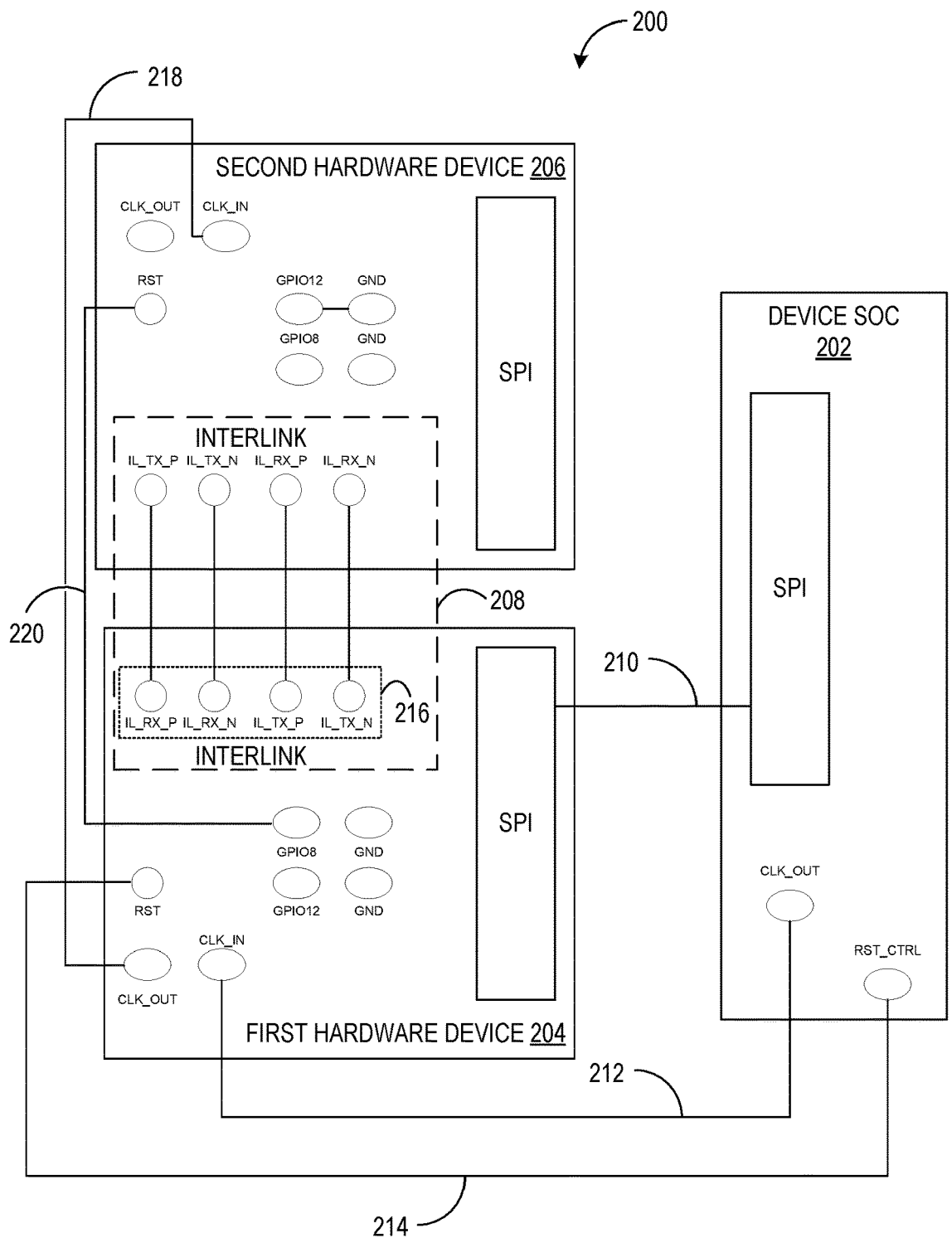
FIG. 2 shows a block diagram of an example hardware configuration that utilizes an interlink between interacting subsystems.

FIG. 2 shows a block diagram of an example hardware configuration 200 of a computing system that utilizes an interlink between interacting subsystems. Computing system 100 is an example of a computing system that may use hardware configuration 200. Hardware configuration 200 comprises a device system-on-a-chip (SoC) 202, a first hardware device 204, a second hardware device 206, and an interlink 208. In some examples, first hardware device 204 is a first touch screen controller and second hardware device 206 is a second touch screen controller. Such a configuration may help to sync touch and stylus input on a device having multiple touch screens. Device SoC 202 is connected to first hardware device 204 via a serial peripheral interface (SPI) 210, a clock signal line 212, and a reset control signal line 214. First hardware device 204 comprises an interlink interface 216 connected to second hardware device 206 via interlink 208. First hardware device 204 is further connected to second hardware device 206 via a clock signal line 218 and a reset control signal line 220. In the depicted example, first hardware device 204 is configured as a primary device and second hardware device 206 is configured as a secondary device. Such a configuration may help communication between first hardware device 204 and second hardware device 206 over interlink 208.

In some examples, interlink 208 can be configured to operate in an intermittently active mode. For example, in the intermittently active mode, interlink 208 may be in an active mode when transmitting data between first hardware device 204 and second hardware device 206, and in an idle mode when not transmitting data. Such a configuration may reduce a power consumption of interlink 208. In some examples, when switching from the idle mode to the active mode, first hardware device 204 and second hardware device 206 can execute a clock and recovery cycle on interlink 208. Such a configuration may help to synchronize operations of first hardware device 204 and second hardware device 206. However, in some such examples, a noise interference scenario may interfere with the clock and recovery cycle and the communication between first hardware device 204 and second hardware device 206. Such a noise interference scenario may result in an unsuccessful clock and data recovery lock. For example, in examples where first hardware device 204 and second hardware device 206 are touch screen controllers, the unsuccessful clock and data recovery lock may impact an operation of a touch screen, such as a loss of touch and stylus input detection.

As mentioned above, to help address such a noise interference scenario, interlink 208 can be changed from an intermittent mode to a persistent active mode in a noise interference scenario. Such a configuration may help to reduce an impact of the noise interference scenario on interlink 208. Further, interlink 208 can be reset to the intermittently active mode after a reboot of hardware configuration 200, such as a sleep mode for example. Such a configuration may enable interlink 208 to be in the intermittently active mode when the noise interference scenario is not detected, providing for power savings. As mentioned above, interlink 208 can comprise a serdes differential pair, or any other suitable connection link in various examples. Such a configuration may help to reduce a number of pins and/or interconnects over a single data transmission line.

Figure 3:
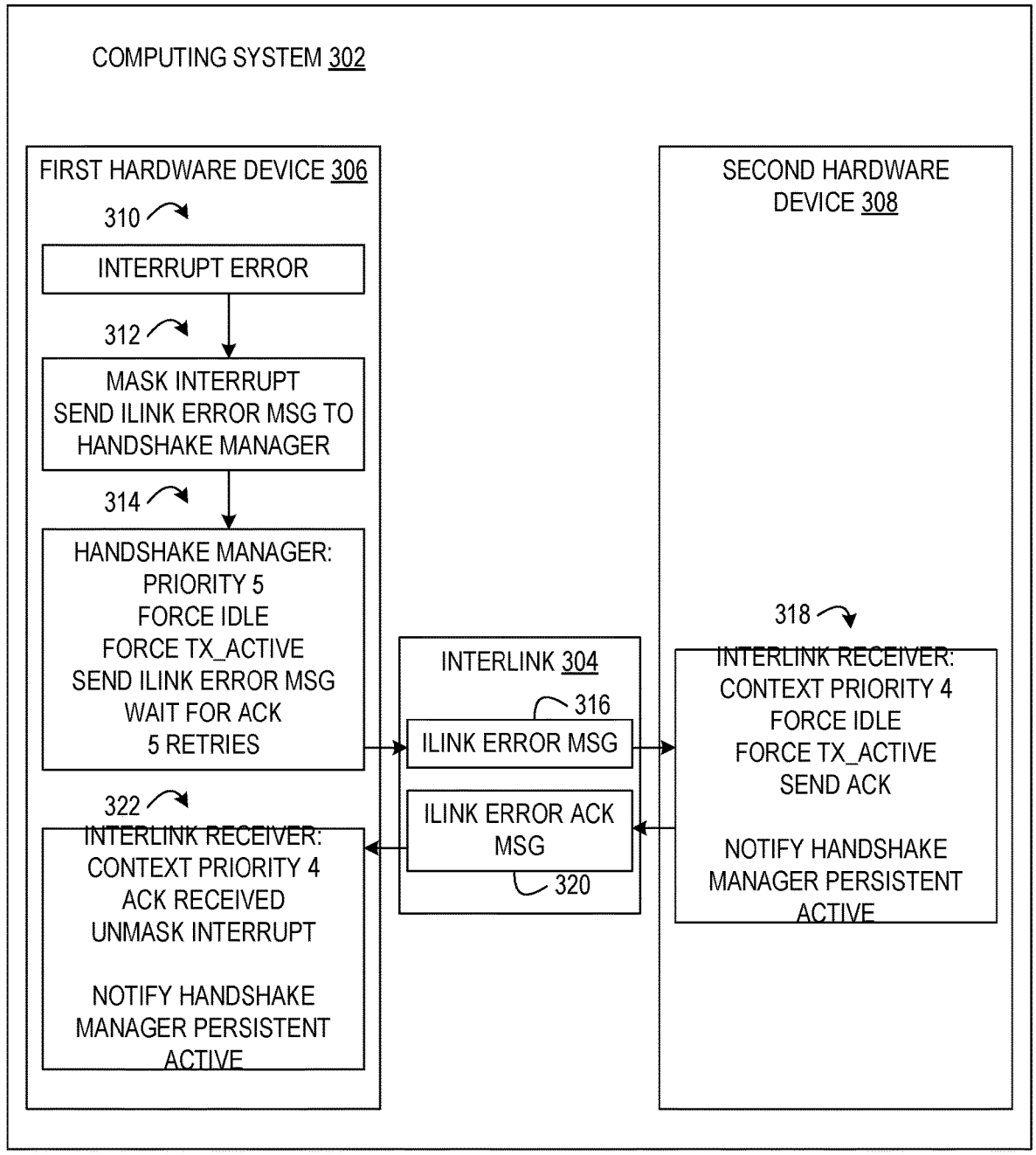
FIG. 3 shows a flow diagram illustrating an example method for handling noise interference on an interlink.

FIG. 3 illustrates a flow diagram illustrating an example method 300 for handling a noise interference scenario on a computing system 302 comprising an interlink 304. Interlink 304 connects a first hardware device 306 and a second hardware device 308. Computing system 100 is an example of computing system 302. First hardware device 306 detects an interlink interrupt error as indicated at 310. In the depicted example, the interlink interrupt error detected can be detected via an error vector register and can enable an interrupt service routine (ISR). An ISR on first hardware device 306 masks the interlink interrupt error and sends an interlink error message to a handshake manager as indicated at 312. In the depicted example, the handshake manager on first hardware device 306, as indicated at 314, forces an interlink idle mode for the transmission part of the interlink on first hardware device 306 so that an interlink connection is set to a known state before syncing for operation in a persistent active mode. The handshake manager further sets a force transmit (TX) active mode for first hardware device 306, sends an interlink error message to second hardware device 308, and waits for an acknowledge (Ack) message from second hardware device 308. The handshake manager may comprise any suitable priority, such as a higher priority than other interlink items (as indicated by a priority of five in this example). In some examples, the handshake manager can be configured for five retries on step 314 before performing a reset on computing system 302. In other examples, the handshake manager can be configured for any suitable number of retries on step 314.

The interlink error message is sent from first hardware device 306 to second hardware device 308, as indicated at 316. On second hardware device 308, an interlink receiver, as indicated at 318, forces an interlink idle mode for the transmission part of the interlink on second hardware device 308 so that an interlink connection is set to a known state before syncing for operation in the persistent active mode. The interlink receiver further sets a force transmit active mode for second hardware device 308, sends the acknowledge message, and notifies the handshake manager that interlink 304 is set to a persistent active mode. The interlink receiver on second hardware device 308 may comprise any suitable priority, such as a higher priority than other interlink items (as indicated by a priority of four in this example). The acknowledge message is sent from second hardware device 308 to first hardware device 306, as indicated at 320. On first hardware device 306, an interlink receiver, as indicated at 322, receives the acknowledge message, unmasks the interlink interrupt error, and notifies a handshake manager that interlink 304 is set to the persistent active mode. The interlink receiver of first hardware device 306 may comprise any suitable priority, such as a higher priority that other interlink items (as indicated by a priority of four in this example). In some examples, first hardware device 306 and second hardware device 308 can be set to the force transmit active mode until computing system 302 performs a reboot, such as after a next sleep mode. Such a configuration may help to enable interlink 304 to be set in an intermittently active mode when the noise interference scenario is not detected after a reboot, and may help to reduce a power consumption of interlink 304.

Figure 4:
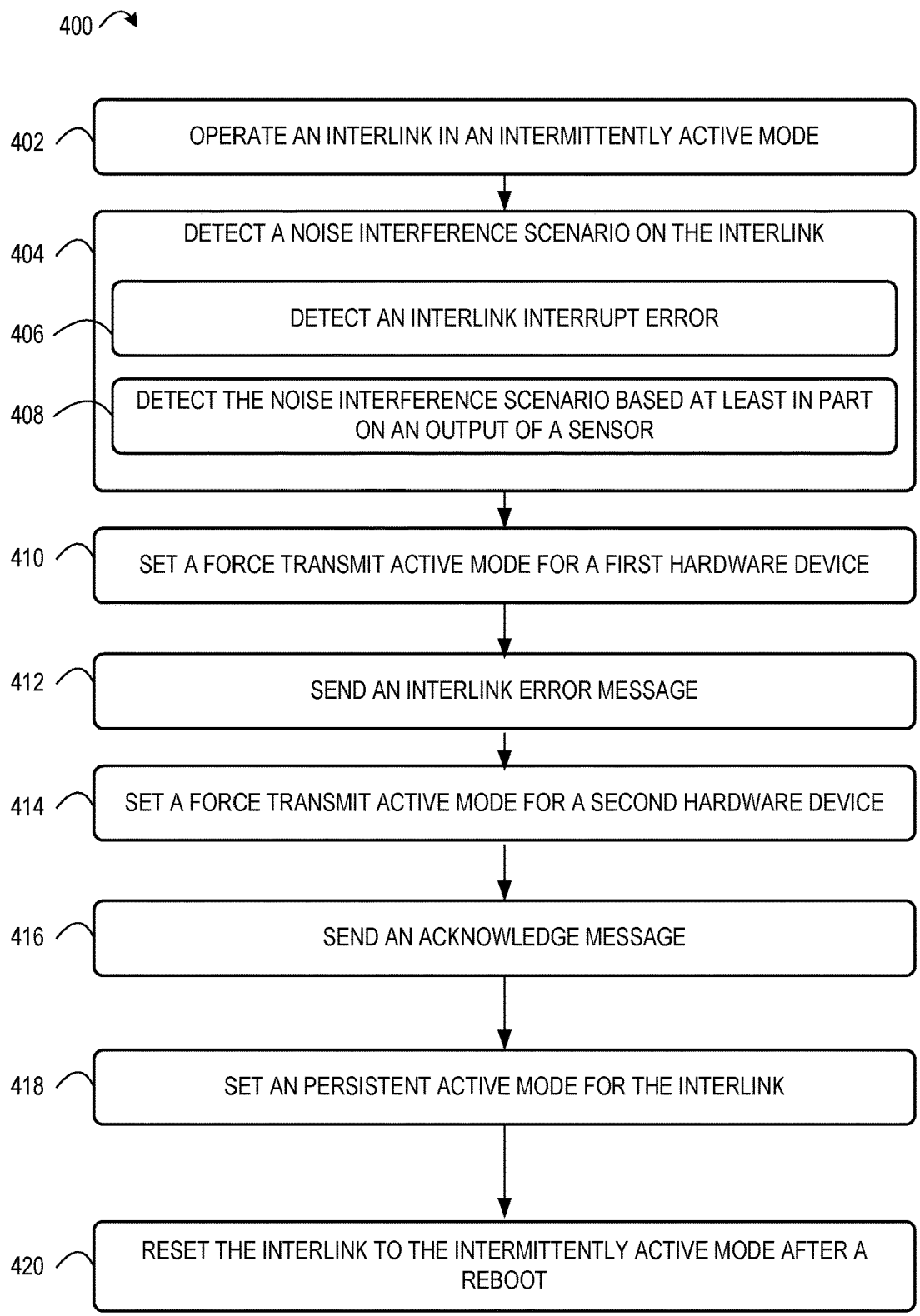
FIG. 4 shows a flow diagram illustrating another example method of handling noise interference on an interlink.

FIG. 4 shows a flow diagram of another example method 400 for detecting and handling a noise interference scenario on an interlink. Method 400 may be performed on computing system 100 or a computing system using hardware configuration 200, as examples. Method 400 comprises, at 402, operating an interlink in an intermittently active mode. The interlink is used for communication between a first hardware device and a second hardware device. The interlink can comprise a serdes differential pair, or any other suitable connection link. In some examples, first hardware device is a first touch screen controller, and second hardware device is a second touch screen controller. In some examples, the intermittently active mode may comprise an active mode and an idle mode. Method 400 comprises, at 404, detecting a noise interference scenario on the interlink. The noise interference scenario may be detected in any suitable manner. In some examples, method 400 comprises, at 406, detecting the noise interference scenario by detecting an interlink interrupt error. In some such examples, the interlink interrupt error may indicate a clock and data recovery lock issue, such as a lock loss or a lock timeout, as examples. In such a manner, the noise interference scenario may be detected via an interrupt handler which may reduce an impact to hardware design. In other examples, method 400 comprises, at 408, detecting the noise interference scenario based at least in part on an output of a sensor, such as a touch sensor for example.

Continuing, method 400 comprises, at 410, setting a force transmit active mode for the first hardware device. Method 400 further comprises, at 412, sending an interlink error message from the first hardware device to the second hardware device, and, at 414, setting a force transmit active mode for the second hardware device after receiving the interlink error message. Method 400 additionally comprises sending, at 416, an acknowledge message from the second hardware device to the first hardware device, and setting, at 418, a persistent active mode for the interlink. In such a manner, a communication handshake regarding the interlink may be established between the first hardware device and the second hardware device. Method 400 further comprises resetting, at 420, the interlink to the intermittently active mode after a reboot, such as a sleep mode. Such a configuration may help to enable the interlink to operate in the intermittently active mode when the noise interference scenario is not detected after the reboot, and may help to reduce a power consumption of the interlink.

Thus, by detecting a noise interference scenario on an interlink and setting the interlink to a persistent active mode in response, a computing system may reduce a susceptibility of the interlink to the noise interference scenario. Further, the interlink can be reset to an intermittently active mode after a reboot, which may help to reduce a power consumption of the interlink compared to maintaining the interlink in a persistent active mode.

In some embodiments, the methods and processes described herein may be tied to a computing system of one or more computing devices. In particular, such methods and processes may be implemented as a computer-application program or service, an application-programming interface (API), a library, and/or other computer-program product.

Figure 5:
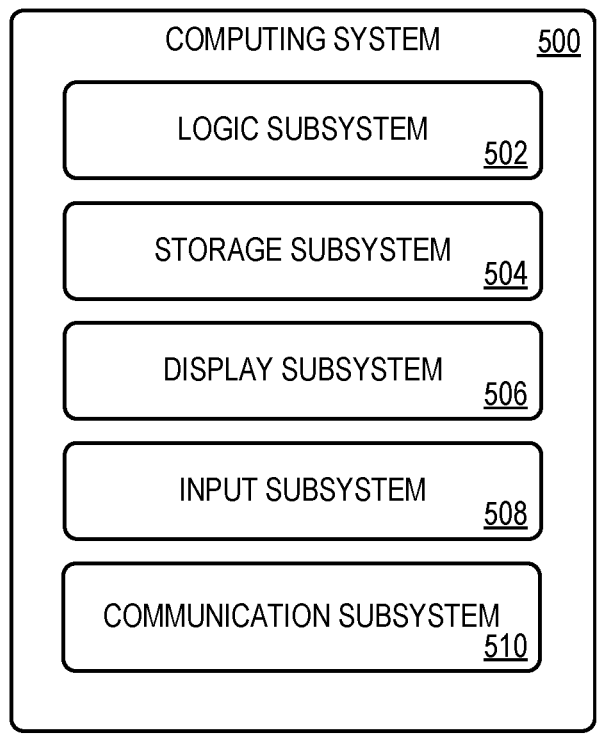
FIG. 5 shows an example computing system.

FIG. 5 schematically shows a non-limiting embodiment of a computing system 500 that can enact one or more of the methods and processes described above. Computing system 500 is shown in simplified form. Computing system 500 may take the form of one or more personal computers, server computers, tablet computers, home-entertainment computers, network computing devices, gaming devices, mobile computing devices, mobile communication devices (e.g., smart phone), and/or other computing devices. Computing system 100 and hardware configuration 200 are examples of computing system 500.

Computing system 500 includes a logic subsystem 502 and a storage subsystem 504. Computing system 500 may optionally include a display subsystem 506, input subsystem 508, communication subsystem 510, and/or other components not shown in FIG. 5.

Logic subsystem 502 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage subsystem 504 includes one or more physical devices configured to hold instructions executable by the logic machine to implement the methods and processes described herein. When such methods and processes are implemented, the state of storage subsystem 504 may be transformed—e.g., to hold different data.

Storage subsystem 504 may include removable and/or built-in devices. Storage subsystem 504 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 504 may include volatile, nonvolatile, dynamic, static, read/write, read-only, random-access, sequential-access, location-addressable, file-addressable, and/or content-addressable devices.

It will be appreciated that storage subsystem 504 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 502 and storage subsystem 504 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 506 may be used to present a visual representation of data held by storage subsystem 504. This visual representation may take the form of a graphical user interface (GUI). As the herein described methods and processes change the data held by the storage machine, and thus transform the state of the storage machine, the state of display subsystem 506 may likewise be transformed to visually represent changes in the underlying data. Display subsystem 506 may include one or more display devices utilizing virtually any type of technology. Such display devices may be combined with logic subsystem 502 and/or storage subsystem 504 in a shared enclosure, or such display devices may be peripheral display devices.

When included, input subsystem 508 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 510 may be configured to communicatively couple computing system 500 with one or more other computing devices. Communication subsystem 510 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 500 to send and/or receive messages to and/or from other devices via a network such as the Internet.

Another example provides a computing system comprising a first hardware device, a second hardware device, an interlink connecting the first hardware device and the second hardware device, a logic system, and a storage system comprising instructions executable by the logic system to operate the interlink in an intermittently active mode, detect a noise interference scenario on the interlink, and in response, set a persistent active mode for the interlink. In some such examples, the instructions are alternatively or additionally executable to set a force transmit active mode for the first hardware device, and set a force transmit active mode for the second hardware device. In some such examples, the instructions are alternatively or additionally executable to send an interlink error message from the first hardware device to the second hardware device, and send an acknowledge message from the second hardware device to the first hardware device. In some such examples, the computing system alternatively or additionally comprises a first touch screen and a second touch screen, wherein first hardware device is a first touch screen controller, and wherein the second hardware device is a second touch screen controller. In some such examples, the instructions executable to detect the noise interference scenario are alternatively or additionally executable to detect an interlink interrupt error. In some such examples, the computing system alternatively or additionally comprises a sensor, and the instructions executable to detect the noise interference scenario are alternatively or additionally executable to detect the noise interference scenario based at least in part on an output of the sensor. In some such examples, the instructions are alternatively or additionally executable to reset the interlink to the intermittently active mode after a reboot of the computing system. In some such examples, the interlink alternatively or additionally comprises a serdes differential pair.

Another example provides, on a computing system comprising a first hardware device, a second hardware device, and an interlink connecting the first hardware device and the second hardware device, a method comprising operating the interlink in an intermittently active mode, detecting a noise interference scenario on the interlink, and in response, setting a persistent active mode for the interlink. In some such examples, the method alternatively or additionally comprises setting a force transmit active mode for the first hardware device, and setting a force transmit active mode for the second hardware device. In some such examples, the method alternatively or additionally comprises sending an interlink error message from the first hardware device to the second hardware device, and sending an acknowledge message from the second hardware device to the first hardware device. In some such examples, detecting the noise interference scenario alternatively or additionally comprises detecting an interlink interrupt error. In some such examples, detecting the noise interference scenario alternatively or additionally comprises detecting the noise interference scenario based at least in part on an output of a sensor. In some such examples, the method alternatively or additionally comprises resetting the interlink to the intermittently active mode after a reboot of the computing system. In some such examples, the computing system further alternatively or additionally comprises a first touch screen and a second touch screen, wherein first hardware device is a first touch screen controller, and wherein the second hardware device is a second touch screen controller. In some such examples, the interlink alternatively or additionally comprises a serdes differential pair.

Another example provides a hardware device comprising an interlink interface configured to connect via an interlink to a second hardware device, a logic system, and a storage system comprising instructions executable by the logic system to operate the interlink interface in an intermittently active mode, detect a noise interference scenario on the interlink interface, in response, set a persistent active mode for the interlink interface. In some such examples, the instructions are alternatively or additionally executable to set a force transmit active mode for the interlink interface. In some such examples, the instructions are alternatively or additionally executable to send an interlink error message on the interlink interface. In some such examples, the instructions are alternatively or additionally executable to detect the noise interference scenario are executable to detect an interlink interrupt error.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system comprising:
   a first hardware device;
   a second hardware device;
   an interlink comprising a serdes differential pair connecting the first hardware device and the second hardware device;
   a logic system; and
   a storage system comprising instructions executable by the logic system to
      operate the interlink in an intermittently active mode,
      detect a noise interference scenario on the interlink, and
      in response, set a persistent active mode for the interlink.

2. The computing system of claim 1, wherein the instructions are further executable to
   set a force transmit active mode for the first hardware device, and
   set a force transmit active mode for the second hardware device.

3. The computing system of claim 2, wherein the instructions are further executable to
   send an interlink error message from the first hardware device to the second hardware device, and
   send an acknowledge message from the second hardware device to the first hardware device.

4. The computing system of claim 1, further comprising a first touch screen and a second touch screen, wherein first hardware device is a first touch screen controller, and wherein the second hardware device is a second touch screen controller.

5. The computing system of claim 1, wherein the instructions executable to detect the noise interference scenario are executable to detect an interlink interrupt error.

6. The computing system of claim 1, further comprising a sensor, and wherein the instructions executable to detect the noise interference scenario are executable to detect the noise interference scenario based at least in part on an output of the sensor.

7. The computing system of claim 1, wherein the instructions are further executable to reset the interlink to the intermittently active mode after a reboot of the computing system.

8. On a computing system comprising a first hardware device, a second hardware device, and an interlink connecting the first hardware device and the second hardware device, a method comprising:
   operating the interlink in an intermittently active mode, the interlink comprises a serdes differential pair;
   detecting a noise interference scenario on the interlink; and
   in response, setting a persistent active mode for the interlink.

9. The method of claim 8, further comprising setting a force transmit active mode for the first hardware device, and setting a force transmit active mode for the second hardware device.

10. The method of claim 9, further comprising sending an interlink error message from the first hardware device to the second hardware device, and sending an acknowledge message from the second hardware device to the first hardware device.

11. The method of claim 8, wherein detecting the noise interference scenario comprises detecting an interlink interrupt error.

12. The method of claim 8, wherein detecting the noise interference scenario comprises detecting the noise interference scenario based at least in part on an output of a sensor.

13. The method of claim 8, further comprising resetting the interlink to the intermittently active mode after a reboot of the computing system.

14. The method of claim 8, wherein the computing system further comprises a first touch screen and a second touch screen, wherein first hardware device is a first touch screen controller, and wherein the second hardware device is a second touch screen controller.

15. A hardware device comprising:
   an interlink interface configured to connect via an interlink comprising a serdes differential pair to a second hardware device;
   a logic system; and
   a storage system comprising instructions executable by the logic system to
      operate the interlink interface in an intermittently active mode,
      detect a noise interference scenario on the interlink interface,
      in response, set a persistent active mode for the interlink interface.

16. The device of claim 15, wherein the instructions are further executable to set a force transmit active mode for the interlink interface.

17. The device of claim 15, wherein the instructions are further executable to send an interlink error message on the interlink interface.

18. The device of claim 15, wherein the instructions are further executable to detect the noise interference scenario are executable to detect an interlink interrupt error.

* * * * *